No. 821,802.  
PATENTED MAY 29, 1906.
W. C. HOOKER.  
ANIMAL TRAP.  
APPLICATION FILED FEB. 19, 1906.
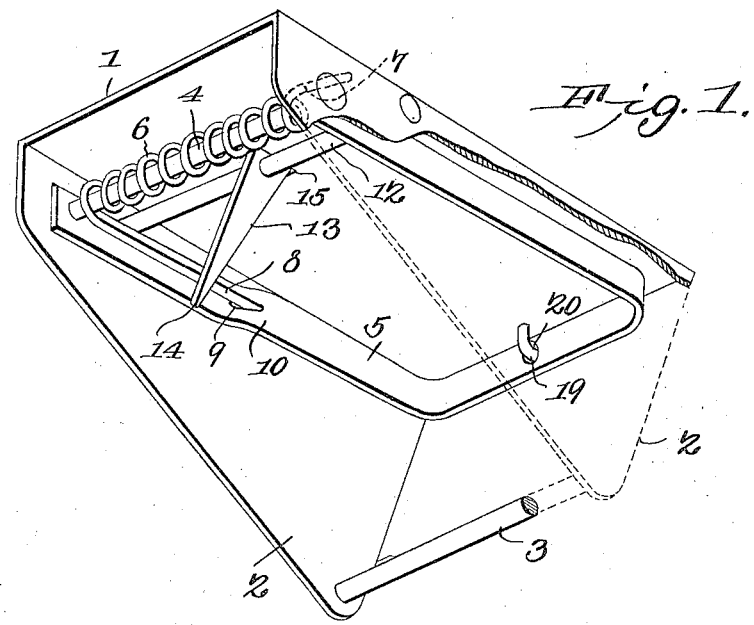
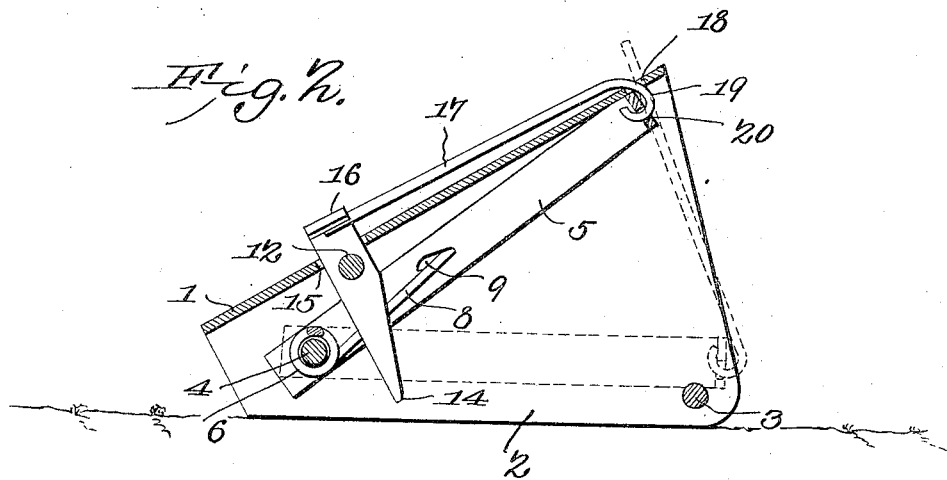
WITNESSES:  
William C. Hooker,  
INVENTOR.  
ATTORNEYS

UNITED STATES PATENT OFFICE.

WILLIAM CHAUNCEY HOOKER, OF ABINGDON, ILLINOIS.

ANIMAL-TRAP.

No. 821,802.  Specification of Letters Patent.  Patented May 29, 1906.

Application filed February 19, 1906. Serial No. 301,870.

*To all whom it may concern:*

Be it known that I, WILLIAM CHAUNCEY HOOKER, a citizen of the United States, residing at Abingdon, in the county of Knox and State of Illinois, have invented a new and useful Animal-Trap, of which the following is a specification.

This invention relates to traps, and is primarily designed to provide a simple and efficient trap especially arranged for catching mice, although, of course, capable of catching any character of small animals. It is, furthermore, proposed to have all of the parts of the trap formed of metal and to produce the body of the trap from sheet metal, thereby to produce an inexpensive trap, which is also strong and durable.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a trap embodying the features of the present invention. Fig. 2 is a longitudinal sectional view thereof.

Like characters of reference designate corresponding parts in both figures of the drawings.

The present trap includes a frame or body made up of a sheet-metal top 1, having its edges bent down to form supporting-flanges 2, which are relatively wide at their front ends and taper rearwardly, so that when the frame or body is supported upon the lower edges of the flanges the top of the frame will be inclined upwardly and forwardly, so as to produce a relatively large entrance-opening at the front of the trap. The lower and front corners of the flanges 2 are connected by a cross-bar 3, and a similar cross-bar 4 connects the rear ends of the flanges in a slightly-elevated position. The front cross-bar 3 is located as close as possible to the bottom edges of the flanges, so as not to obstruct the entrance-opening.

Within the body there is a yoke-shaped or U-shaped bail 5, constituting the jaw of the trap, the free ends of the sides of the jaw being pierced by the rear cross-bar 4, upon which the jaw swings. A helical spring 6 embraces the cross-bar 4, with one end portion 7 bearing against the under side of the top, while the other end portion 8 is extended forwardly at the inner face of the adjacent side of the jaw and then passed through an opening 9 in the inwardly offset portion 10 of the jaw. The tendency of the spring is to swing the jaw downward against the cross-bar 3 as a stop. Above and slightly in front of the cross-bar 4 there is another cross-bar 12, which pierces an intermediate portion of an upright trigger 13, the lower end of which is pointed, as at 14, for the impalement of the bait, while the upper end portion rises through an opening 15 in the top of the trap. The upper extremity of the trigger is bent laterally to form a hook 16 for engagement with the free end of a latch-bar 17, working through an opening 18 in the front of the top of the frame and loosely connected to the free end of the jaw. The connection between the latch and the jaw is effected by means of the hooked terminal 19 of the latch engaged through an opening 20 in the front of the jaw.

In practice the trap is set, as in Fig. 2, the bait being impaled upon the lower end of the trigger 13 and the latch 17 engaged with the upper end of the trigger, so as to hold the jaw elevated. When a mouse enters the open front of the trap and attempts to pull upon the bait carried by the lower end of the trigger, the upper end of the latter will be tilted rearwardly and its hook 16 disengaged from the latch 17, whereupon the jaw will be released and the spring snap the same down, so as to grip the neck of the mouse between the jaw and the cross-bar 3. When the trap is sprung, the latch 17 extends upwardly across the open end of the trap and prevents access of other mice to the bait.

Having thus described the invention, what is claimed is—

1. A trap comprising a sheet-metal frame bent to form a top and downturned sides, the lower edges of the sides being inclined to support the top in an upwardly and forwardly inclined position, said top having front and rear openings, upper and lower rear cross-bars connecting the sides of the frame, a yoke-shaped jaw having its ends pivoted upon the lower rear cross-bar, a spring embracing the lower cross-bar with one end engaging the top of the frame and the other end engaging the jaw with a tendency to force the latter downwardly, a trigger pivoted intermediate of its ends upon the upper cross-bar and working through the rear opening in the top of the frame, the upper free end of the trigger having a lateral projection and the lower end constituting a bait-holder, and a latch pivotally carried by the free end of the jaw and working through the opening in the front of the top of the frame for engagement with the projection of the trigger.

2. A trap including a frame having a sheet-metal top and downturned sides, with the lower edges of the sides inclined to support the top in an upwardly and forwardly inclined position, the top having front and rear openings, a front cross-bar connecting the lower portions of the sides, upper and lower rear cross-bars, a yoke-shaped jaw having its ends pivoted upon the lower rear cross-bar, one of the sides of the jaw having an offset portion, a helical spring embracing the lower rear cross-bar with one end engaging the top of the trap and the other end passed through an opening in the shoulder formed by the offset portion of the jaw, a trigger pivoted intermediate of its ends upon the upper cross-bar and working through the rear opening in the top of the trap, the lower end of the trigger constituting a bait-holder, and the upper end being bent into a hook, and a latch pivotally connected to the free end of the jaw and working through the opening in the front of the top of the trap for engagement with the hook of the trigger.

In testimony that I claim the foregoing as my own I have hereto affixed my signature in the presence of two witnesses.

WILLIAM CHAUNCEY HOOKER.

Witnesses:
 V. H. THOMAS,
 AMY DONAHO.